(12) United States Patent
Eltabakh et al.

(10) Patent No.: US 11,409,743 B2
(45) Date of Patent: Aug. 9, 2022

(54) PROPERTY LEARNING FOR ANALYTICAL FUNCTIONS

(71) Applicant: TERADATA US, INC., San Diego, CA (US)

(72) Inventors: Mohamed Ahmed Yassin Eltabakh, Worcester, MA (US); Mohammed Al-Kateb, Rancho Palos Verdes, CA (US); Awny Kayed Al-Omari, Cedar Park, TX (US); Sanjay Nair, El Segundo, CA (US)

(73) Assignee: Teradata US, Inc., San Diego, CA (US)

( * ) Notice: Subject to any disclaimer, the term of this patent is extended or adjusted under 35 U.S.C. 154(b) by 244 days.

(21) Appl. No.: 16/724,565

(22) Filed: Dec. 23, 2019

(65) Prior Publication Data

US 2021/0034624 A1 Feb. 4, 2021

Related U.S. Application Data

(60) Provisional application No. 62/881,815, filed on Aug. 1, 2019.

(51) Int. Cl.
*G06F 17/00* (2019.01)
*G06F 16/2453* (2019.01)
*G06F 16/25* (2019.01)
*G06N 20/00* (2019.01)

(52) U.S. Cl.
CPC ...... *G06F 16/24542* (2019.01); *G06F 16/252* (2019.01); *G06N 20/00* (2019.01)

(58) Field of Classification Search
CPC .. G06F 16/24542; G06F 16/252; G06N 20/00
See application file for complete search history.

(56) References Cited

U.S. PATENT DOCUMENTS

| 10,824,625 | B1* | 11/2020 | Hofstetter | ......... G06F 16/24545 |
| 10,896,176 | B1* | 1/2021 | Creedon | ............... G06F 16/256 |
| 2004/0107203 | A1* | 6/2004 | Burdick | ................. G06F 16/20 |
| 2017/0351971 | A1* | 12/2017 | Cai | ...................... G06Q 30/02 |
| 2020/0210883 | A1* | 7/2020 | Al-Omari | ......... G06F 16/24542 |
| 2020/0394534 | A1* | 12/2020 | Krishnan | ................ G06F 17/15 |
| 2021/0232768 | A1* | 7/2021 | Ling | ..................... G16B 50/10 |

OTHER PUBLICATIONS

Submaranian et al., U.S. Appl. No. 16/704,802 entitled Enabling Cross-Platform Query Optimization via Expressive Markup Language filed Dec. 5, 2019 (84 pages).
Emani et al., Extracting Equivalent SQL from Imperative Code in Database Applications, SIGMOD'16, Jun. 26-Jul. 1, 2016 (16 pages).
Oracle, pl/sql function result cache in 11g, Jun. 2010 (36 pages).
Ramachandra et al., Optimization of Imperative Programs in a Relational Database, Technical Report, Aug. 2019 (17 pages).

* cited by examiner

*Primary Examiner* — Greta L Robinson
(74) *Attorney, Agent, or Firm* — Trop, Pruner & Hu P.C.

(57) ABSTRACT

In some examples, a system learns properties of an analytical function based on information of queries invoking the analytical function that have been previously executed, creates a function descriptor for the analytical function based on the learning, and provides the function descriptor for use by an optimizer in generating an execution plan for a received database query that includes the analytical function.

20 Claims, 3 Drawing Sheets

PROPERTY LEARNING FOR ANALYTICAL FUNCTIONS

CROSS REFERENCE TO RELATED APPLICATION

This application claims the benefit of U.S. Provisional Application No. 62/881,815, filed Aug. 1, 2019, which is hereby incorporated by reference in its entirety.

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A database query, such as a SQL query, can include an analytical function that is invoked to perform one or more operations. An analytical function can receive input data (in the form of relational tables or parameters) and generates output data in the form of relational tables. Examples of operations that can be performed by an analytical function include any or some combination of the following: sorting data, ranking data, computing a mathematical aggregate (e.g., computing an average, computing a sum, computing a minimum or maximum), clustering data, and so forth.

An analytical function that is invoked by a database query can execute locally (i.e., in the DBMS that received the database query) or remotely (on a remote system that is remotely located from the DBMS that received the database query).

In both cases (the case where the analytical function is executed locally or the case where the analytical function is executed remotely), the characteristics and properties of the analytical function may be unknown to the DBMS. As a result, an optimizer in the DBMS may not be able to produce an optimal execution plan (also referred to as a query plan) for the query that invokes the analytical function.

An optimizer can generate multiple execution plans in response to a given database query. The optimizer selects the most efficient query plan from among the multiple execution plans. Each execution plan includes a sequence of executable steps to perform to process the database query. A scheduler of the DBMS can send the executable steps of the selected execution plan to respective processing engine(s) of the DBMS for execution.

To address the issue of an optimizer not being able to develop an optimal execution plan for a database query including an analytical function whose properties are unknown to the optimizer, a metadata object (referred to as a function descriptor) may be manually created by a human for the analytical function. The function descriptor encodes the characteristics and properties of the analytical function. The function descriptor can be consumed by an optimizer to possibly re-write the database query invoking the analytical function, and to optimize execution of the analytical function.

A human may have to manually create the function descriptor from scratch, which can be a time-consuming and labor-intensive process. Moreover, there is a scalability issue if function descriptors have to be created manually for a large number of analytical functions.

In accordance with some implementations of the present disclosure, an automated and autonomous approach is provided for learning an analytical function's properties from the observed behavior of the analytical function's previous executions. In some cases, given the black box nature of analytical functions, the learned properties cannot be generalized to all possible inputs with 100% confidence. Therefore, an approach according to some implementations of the present disclosure attempts to learn the properties of an analytical function, and then generates recommendations to be verified by human domain experts before being used in query optimization.

The approach according to some implementations of the present disclosure partially removes the burden of learning and expressing properties of analytical functions from domain experts, and enables the underlying DBMS to discover such properties. Moreover, the autonomous approach is expected to scale better than the manual approach since validating the recommended properties of analytical functions can be quicker and easier than deriving the properties from scratch.

In other examples, non-semantic properties, e.g., cardinality estimation, learned by the autonomous approach do not have to be presented to humans for verification, but rather can be used for producing function descriptors that can be consumed by an optimizer in developing execution plans.

Figure 1:
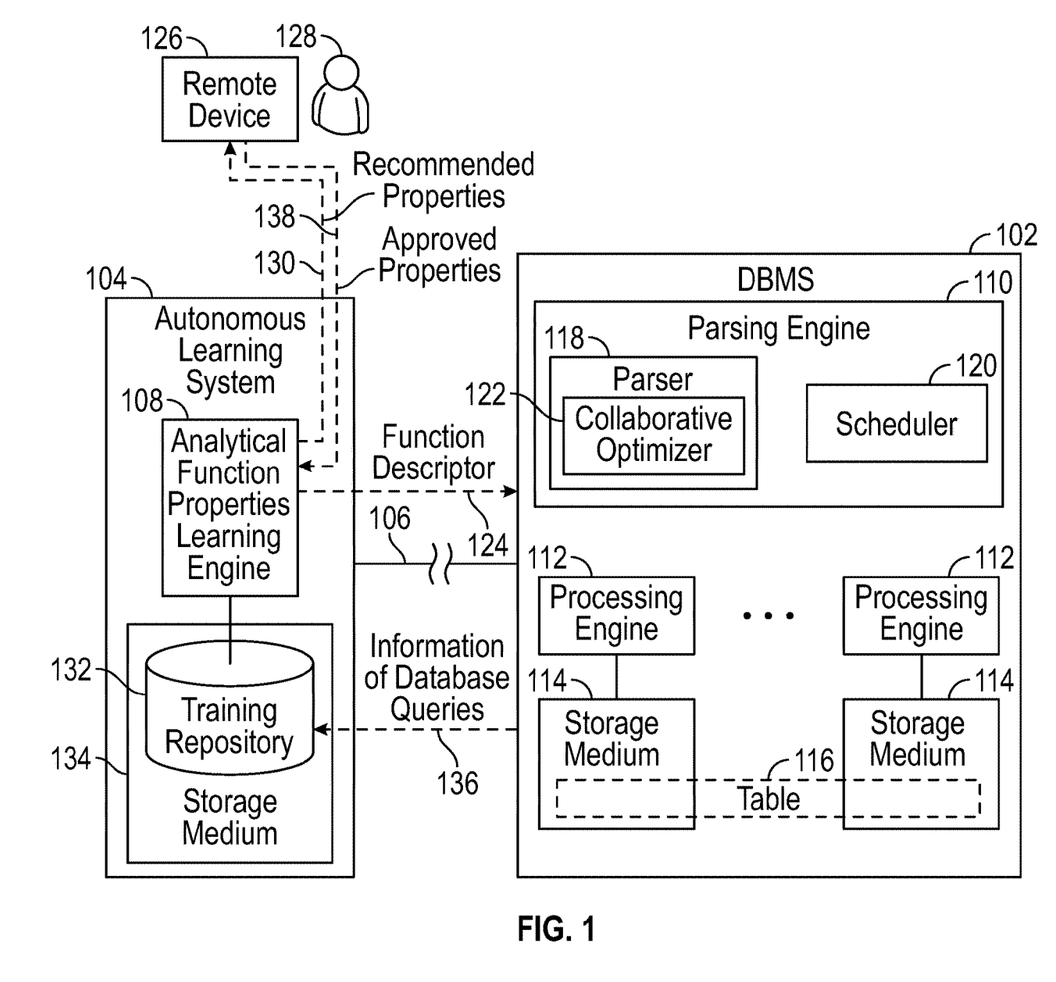
FIG. 1 is a block diagram of an example arrangement that includes an autonomous learning system and an example database management system that includes a collaborative optimizer, according to some implementations of the present disclosure.

FIG. 1 is a block diagram of an example arrangement that includes a DBMS 102 and an autonomous learning system 104 according to some examples of the present disclosure.

The autonomous learning system 104 can be implemented using a computer or multiple computers. Although the autonomous learning system 104 is shown as being separate from the DBMS 102, in other examples, the autonomous learning system 104 (or the components of the autonomous learning system 104) can be part of the DBMS 102. In examples where the autonomous learning system 104 is separate from the DBMS 102, the autonomous learning system 104 can be coupled to the DBMS 102 over a network 106 or other communication link.

The network 106 can include a public network (e.g., the Internet), a local area network (LAN), a wide area network (WAN), a wireless network (e.g., a wireless local area network or WLAN, a cellular network, etc.), or any other type of network.

The autonomous learning system 104 includes an analytical function properties learning engine 108 to autonomously learn properties of analytical functions, in accordance with some implementations of the present disclosure.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The DBMS 102 includes a parsing engine 110 that is able to process SQL queries, including data definition language (DDL) statements and data manipulation language (DML) statements.

In addition to the parsing engine 110, the DBMS 102 includes multiple processing engines 112.

The multiple processing engines 112 are able to execute in parallel with one another, and are able to access, in parallel, different data portions in the storage media 114. Each processing engine 112 is considered a Unit Of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), an ordered analytic operation, and so forth. An ordered analytic operation refers to an operation that has an order specification (specifying an order based on one or more attributes, e.g., sorting based on the one or more attributes) or an expression that performs some predetermined analysis, such as ranking, computing a moving average within a window size, calculating a cumulative total, calculating a percentile, and so forth.

In other examples, the DBMS 102 can include just one processing engine 112.

In examples where there are multiple processing engines 112, a relational table 116 (or other data structures can be distributed across respective storage media 114 that are associated with the corresponding processing engines 112. Each storage medium 114 is associated with a respective processing engine 112, such that the processing engine 112 is able to manage access of data in the associated storage medium 114. The storage medium 114 can refer to a physical storage device (or group of physical storage devices) or to a logical storage device.

A physical storage device can include any or some combination of the following: a volatile memory device, such as a dynamic random access memory (DRAM) device, a static random access memory (SRAM) device, and so forth; a nonvolatile memory device, such as a flash memory device, or any other type of nonvolatile memory device; a disk-based storage device; a solid state storage device; and so forth.

A logical storage device can include any partition of one or more physical storage devices.

In other examples, instead of storing data in local storage of the DBMS 102 such as the storage media 114, database data can be stored in a remote data store (not shown) that is coupled to the DBMS 102 over a network. The remote data store can be provided in a cloud or another remote computing environment. The remote data store can be an object store that stores objects of variable sizes. For example, each object can have a size between 10 megabytes (MB) and 100 MB. In other examples, an object can have a smaller or larger size. An object in an object store is typically larger in size than data records (e.g., rows, tables, etc.) stored in a local storage of the DBMS 102.

The parsing engine 110 of the DBMS 102 can include a parser 118 and a scheduler 120. The parser 118 or scheduler 120 can be part of the hardware processing circuit of the parsing engine 110, or can include machine-readable instructions executable on the parsing engine 110.

The parser 118 receives database queries (such as SQL queries, load requests, etc.) submitted by one or more client devices (not shown), which may be coupled to the DBMS 102 over an interconnect (e.g., the network 106 or another communication link). The parser 118 parses each received database query, and generates executable steps for the parsed query. The parser 118 includes a collaborative optimizer 122 that generates multiple execution plans in response to a query. The collaborative optimizer 122 selects the most efficient query plan from among the multiple execution plans. Each execution plan includes a sequence of executable steps to perform to process the database query. The scheduler 120 sends the executable steps of the selected execution plan to respective one or more processing engines 112.

Each processing engine 112 manages access of data records in respective data portions in a data store (e.g., the storage media 114 or a remote data store). Each processing engine 112 can perform the following tasks: inserts, deletes, or modifies contents of tables or other data records; creates, modifies, or deletes definitions of tables or other data records; retrieves information from definitions and tables or other data records; locks databases and tables or other data records; and so forth.

In accordance with some implementations of the present disclosure, to create an execution plan for a database query that invokes an analytical function (or multiple analytical functions), the collaborative optimizer 122 uses one or more function descriptors 124 that describe properties of the one or more analytical functions included in the database query. A "function descriptor" can refer to any metadata that describes or indicates one or more properties of an analytical function.

In examples according to FIG. 1, the one or more function descriptors 124 are provided by the analytical function properties learning engine 108 of the autonomous learning system 104. In other examples, the function descriptor(s) 124 can be provided by one or more remote devices 126 associated with one or more domain experts 128. The function descriptor(s) 124 provided by the one or more remote devices 126 is (are) based on recommended properties 130 provided by the analytical function properties learning engine 108.

As shown in FIG. 1, the analytical function properties learning engine 108 uses information stored in a training repository 132 to learn properties of an analytical function. The training repository 132 is stored in a storage medium 134 of the autonomous learning system 104. The training repository 132 can be incrementally built and updated as database queries are executed by the DBMS 102. Information of database queries 136 are provided by the DBMS 102 to the training repository 132. In some examples, the training repository 132 is updated if performed in an online manner at query time (at the time of execution of database queries by the DBMS 102). In some examples, the training repository 132 can be stored within the database system storage media 114.

In some examples, the learning of properties of analytical functions based on the training repository 132 can be performed by the analytical function properties learning engine 108 in an offline manner (i.e., the learning does not have to be performed during execution of database queries by the DBMS 102). Rather, the learning by the analytical function properties learning engine 108 can be performed after the training repository 132 has been built based on executions of database queries by the DBMS 102.

Based on information of database queries 136 included in the training repository 132, the analytical function properties learning engine 108 can produce recommended properties 130 for an analytical function. The recommended properties 130 can be communicated by the analytical function properties learning engine 108 to the one or more remote devices 126 that are associated with the one or more domain experts 128. Each domain expert 128 can review the recommended properties 130 at the respective remote device 126. The domain expert 128 can approve the recommended properties 130, or can revise or add properties. Based on the recommended properties 130, the domain expert 128 produces approved properties 138, and the respective remote device 126 sends the approved properties 138 to the analytical function properties learning engine 108. The approved properties 138 are then used to produce the function descriptor 124 that is provided to the DBMS 102 for use by the collaborative optimizer 122 in developing execution plans for database queries that invoke the analytical function. In other examples, instead of providing the approved properties 138 to the analytical function properties learning engine 108 which in turn creates the function descriptor 124, the domain expert 128 can produce the function descriptor 124 at the remote device 126 based on the recommended properties 130, and can send the function descriptor 124 from the remote device 126 to the DBMS 102 for use by the DBMS 102.

At the DBMS, the function descriptors for various analytical functions can be stored in the storage media 114 or in a memory of the DBMS 102.

Optimizing the execution of a black box analytical function invoked by the DBMS 102 can speed up the execution of the analytical function, and hence the entire database query, by an order of magnitude or more, for example.

In some examples, two types of optimizations can be provided for analytical functions: (1) projection push, and (2) predicate push. In other examples, other types of optimizations can be provided for analytical functions. Generally, optimizations for an analytical function can apply a re-write of the analytical function's invocation body for early elimination of any unneeded data (columns or rows) from the analytical function's input before executing the analytical function.

Projection push can refer to the optimization of projecting out and eliminating unnecessary columns from the analytical function's input table(s) before executing the analytical function. Predicate push can refer to the optimization of pushing a post-function predicate in the database query to the function's input before executing the function.

A challenge in performing optimizations for analytical functions involves how to capture properties of the analytical functions that can then be used to perform projection push and predicate push. As noted above, deriving properties of analytical functions manually by humans from scratch can be slow and does not scale well when the number of analytical functions is large. Further, entirely manual approaches do not leverage the power of the underlying DBMS that can learn most of the properties of analytical functions in an autonomous way.

In some implementations of the present disclosure, a hybrid approach that uses both autonomous learning of properties of analytical functions and manual approval of the learned properties can be employed.

The following describes an example of a projection push and a predicate push for an example initial database query set forth in Table 1 below.

Table 1

TABLE 1

```
SELECT *
FROM (SELECT * FROM A_FUNCTION (
         ON (SELECT * FROM T1) PARTITION BY ANY
         ON dic AS dict DIMENSION
         USING    TextColumn('comment')
                  Level ('document')
                  Accumulate ('id', 'product', 'category')
      ) AS out
   ) AS t
WHERE t.product = camera
```

In Table 1 above, the database query includes an invocation of an A_FUNCTION( ) analytical function. The analytical function's primary input table is table T1, which may contain tens or even hundreds of columns. The analytical function's invocation also involves some parameters, e.g., TextColumn, Level, and Accumulate.

Without any knowledge on the analytical function's properties and its internal semantics, the database query will execute exactly as submitted by a requester, in the form shown in Table 1.

However, if a function descriptor for the A_FUNCTION( ) analytical function is provided, projection push and predicate push optimizations can be performed. For example, the function descriptor can include a projection push segment containing instructions specifying that the mandatory columns of the analytical function are those columns specified within the TextColumn and Accumulate parameters, e.g., comment, id, product, category. The instructions (in the function property) identifying the mandatory columns are examples of projection-push properties that can be derived using techniques according to some implementations of the present disclosure.

Based on the function descriptor, the collaborative optimizer 122 can re-write the analytical function's invocation to the modified database query depicted in Table 2 below.

Table 2

TABLE 2

```
SELECT *
FROM (SELECT * FROM A_FUNCTION (
         ON (SELECT comment, id, product, category FROM T1)
            PARTITION BY ANY
         ON dic AS dict DIMENSION
```

TABLE 2-continued

```
    USING       TextColumn('comment')
                Level ('document')
                Accumulate ('id', 'product', 'category')
        ) AS out
    ) AS t
WHERE t.product = camera
```

In the modified database query, the clause SELECT * FROM T1 in the initial database query of Table 1 has been replaced with SELECT comment, id, product, category FROM T1 in the modified database query of Table 2.

Moreover, the function descriptor can include a predicate push segment containing parameters specifying whether or not it is safe to push a post-function predicate at the row-level to the analytical function's input without affecting the analytical output of the function. The parameters (in the function property) specifying whether or not it is safe to push a post-function predicate at the row-level to the analytical function's input are examples of predicate-push properties that can be derived using techniques according to some implementations of the present disclosure.

In the initial database query of Table 1, the post-function predicate is WHERE t.product=camera. More generally, a post-function predicate is a predicate that is applied on the output of the analytical function.

If the predicate push segment of the function descriptor specifies that it is safe to push a post-function predicate at the row-level to the analytical function's input, then the collaborative optimizer 122 can re-write the database query as shown in Table 3 below.

TABLE 3

```
SELECT * FROM A_FUNCTION (
    ON (SELECT comment, id, product, category FROM T1
        WHERE t.product = camera) PARTITION BY ANY
    ON dic AS dict DIMENSION
    USING       TextColumn('comment')
                Level ('document')
                Accumulate ('id', 'product', 'category')
        ) AS out
```

In the further modified database query of Table 3, the predicate (WHERE t.product=camera) has been moved to the input of the analytical function. By moving the predicate to the input of the analytical function, the number of rows that have to be processed by the analytical function can be reduced (i.e., the analytical function processes those rows that satisfy the predicate, and does not have to process those rows that do not satisfy the predicate).

The syntax of a function descriptor can be of any form, whether proprietary, public, or standardized.

In some examples, the properties of interest for building a function descriptor include a (1) property that enables projection push optimization (for learning the minimal set of attributes (columns) from an analytical function's input tables(s) that are required by the analytical function for correct execution (i.e., execution of the analytical function that does not produce an erroneous output), and (2) a property that enables predicate push optimization (for learning the analytical function's behavior and whether or not it is safe to push post-function predicates, whether at the row level or the partition level (if the function has a partitioning clause), to the analytical function's input tables). Other properties are also possible, such as cardinality estimation and join-related properties.

A single analytical function may have many different invocation signatures. This is due to the fact that some of the input tables (e.g., the ON clauses) can be optional, and similarly, some of the function's parameters (e.g., in the USING clause) can be also optional. Given a number of input tables and a number of parameters, there can be a relatively large number of different invocation signatures associated with the analytical function, where the different invocation signatures represent different combinations of input tables and parameters that are required.

The different invocation signatures can result in a major difference between autonomously learning an analytical function's properties and having a human domain expert providing the analytical function's descriptor. The function descriptor is supposed to be a superset object describing the analytical function's properties under all possible invocation signatures, i.e., a comprehensive metadata object.

In contrast, in the autonomous learning approach according to some implementations of the present disclosure, the properties are learned only for the observed invocation signatures from past executions of database queries invoking the analytical function. The learned properties may or may not apply to new invocation signatures. This means that the autonomous learning is performed for each unique invocation signature. Once the training repository 132 is built for different invocation signatures, a systematic technique can be used to combine the learned properties (discussed further below). Moreover, with the hybrid approach according to some implementations of the present disclosure, domain experts can generalize the learned properties of specific invocation signature(s) to other invocation signatures.

Two invocations of the same analytical function are considered to have an identical invocation signature if the analytical function receives the same inputs, e.g., the invocations involve the same set of parameters and the same ON clauses (including the PARTITION BY within the ON clauses). Otherwise, the invocations are considered to have different invocation signatures.

The training repository 132 that is incrementally built and updated with database queries can store the following information for each respective database query, as examples: (1) the database query syntax, and (2) copies of the input tables (only if these tables are small), or otherwise small samples of larger input tables.

As noted above, the update of the training repository 132 is an online query-time process. In contrast, the learning phase performed by the analytical function properties learning engine 108 is an offline phase, which can learn the properties of an analytical function using (1) predicting properties for projection push and predicate push according to static heuristics based on the query syntax, and (2) mocked execution in which the analytical function gets executed on sample data to test whether or not the predicted properties will hold.

The output from the learning phase is a set of recommended properties (130 in FIG. 1) that are passed to one or more domain experts (e.g., to one or more remote devices 126) for validation and approval. The approved properties (138 in FIG. 1) are exploited in optimizing future database queries.

Section 1 below describes details of autonomous learning of projection-push properties, and section 2 below describes details of autonomous learning of predicate-push properties.

1. Autonomous Learning of a Projection-Push Properties

For simplicity, the problem for autonomous learning of a projection-push properties can be divided into two cases. A first case involves an analytical function that requires as input a single primary table and optionally zero or more dimension tables. The assumption is that dimension tables are relatively very small and not subject to projection push, whereas the primary table is a relatively large table for which projection push is useful.

A second case generalizes the first case where the analytical function requires multiple primary tables as input.

1.1 Case 1: Analytical Functions with a Single Primary Table

An input to the learning phase is a user's SQL query Q involving an invocation to an analytical function F( ) in the format of Table 4, for example:

TABLE 4

```
F(
    ON R_primary [PARTITION BY ...] [ORDER BY ...]
                        //Primary input table R_primary(a_1, a_2, ..., a_n)
    [ON R_1 DIMENSION]  //Optional Dimension table
    ...
    [ON R_k DIMENSION]  //Optional Dimension table
    USING               //Set of function's parameters
        Parameter P_1(...)
        ...
        Parameter P_m(...) )
```

In some examples, analytical functions can be implemented as table operators. However, the techniques according to some implementations of the present disclosure can be applied to any implementation that passes to an analytical function a set of tables (base or derived tables) and a set parameters as inputs.

From the input schema of $R_{primary}(a_1, a_2, \ldots, a_n)$, the analytical function properties learning engine 108 learns which columns are the mandatory columns for F( ), and where these columns are specified within the analytical function's invocation, i.e., the instructions that should extract the mandatory columns from the invocation clauses. Note that learning the instructions is the ultimate goal since the column names may change from one query to another.

1.1.1 Task 1 (Incrementally Building the Training Repository at Query Time)

Each new database query (the SQL syntax) is stored in the training repository 132 along with copies of the dimension tables, and a sample (e.g., 1%, 2%, 10% or any other portion) of the primary table $R_{primary}$. The rationale is that the dimension tables are typically relatively small and can be easily stored in the training repository 132. On the other hand, the primary table $R_{primary}$ can be a relatively large table and it may not be feasible to replicate the primary table in the training repository 132.

Moreover, the learning approach performed by the analytical function properties learning engine 108 does not really rely on the entire primary table. In most cases, the mandatory columns from the primary table required by the analytical function do not depend on the number of rows of the primary table, i.e., two identical invocations of F( ) over different sizes of the primary table $R_{primary}$ should not result in different column selections.

This is a typical behavior for most functions. In the rare cases in which this is not the behavior, the offline learning phase can detect such cases and stop learning the properties of the analytical function.

1.1.2 Task 2 (Offline Learning through Heuristics)

As noted above, the autonomous learning is performed per a single invocation signature of an analytical function. Task 2 by the analytical function properties learning engine 108 is triggered when k queries are collected: $G=\{Q_1, Q_2, \ldots, Q_k\}$, where $k \leq 1$, and the k queries share the same invocation signature of a given function F( ). In task 2, the analytical function properties learning engine 108 applies a set of static heuristics on the syntax of the k queries. Examples of these heuristics are included in Table 5 below.

The first column of Table 5 lists various example static heuristics that can be employed by the analytical function properties learning engine 108, and the third column of Table 5 specifies the action that is performed by the analytical function properties learning engine 108 for the respective heuristic.

A PARTITION BY clause partitions data into multiple partitions based on values of one or more attributes in the PARTITION BY clause, and an ORDER BY clause orders data according to values of one or more attributes in the ORDER BY clause.

TABLE 5

| Heuristic | Description | Action |
|---|---|---|
| Explicit reference of a column name in the PARTITION BY or ORDER BY clauses | If a column $a_i$ is explicitly referenced by name in one of the ON clauses in the PARTITION BY or ORDER BY clause, then $a_i$ should be one of the mandatory columns to be passed to the function. | Mark $a_i$ as a mandatory column |
| Explicit reference of a column name in one of the parameters | If a column $a_i$ is explicitly referenced by name within one of the parameters, then the probability of $a_i$ being one of the mandatory columns is to be adjusted. | Set the adjustment delta (positive or negative) based on several factors including:<br><br>The format of the parameter's value, e.g., CSV (comma-separated value) field or free text (where a parameter having the CSV format is more indicative of being a mandatory column, an a parameter having a free |

TABLE 5-continued

| Heuristic | Description | Action |
|---|---|---|
| | | text format is less indicative of being a mandatory column) The chances that $a_i$ is a common English word that would appear in the parameter's value without actually referring to the column of the same name Whether the column name is preceded by a negation sign, which means excluding the column (and thus reduces the likelihood that the column is mandatory) |
| Implicit reference of a column, e.g., by position or within a range | Ranges within parameter values may refer to specific columns in $R_{primary}$. Therefore, the probabilities of these columns of being among the mandatory columns is adjusted. | Set the adjustment delta (positive or negative) based on several factors including: The format of the parameter's range, e.g., name-based or number-based. Name-based ranges give a higher confidence that the range is referring to the corresponding columns in $R_{primary}$. For number-based ranges, e.g., [2:5], some predictions and evidences are established on whether or not the range is related to the columns of the input schema. That can be learned from the range values from different queries compared to the number of columns in the input schema. |
| References of column names in the outer query (outside the analytical function's invocation) | If column $a_i$ is referenced in the outer query and that column does not exist in any other table in the FROM clause of the query, then this column is generated from the analytical function. If $a_i$ is in the analytical function's input schema in $R_{primary}$, then most probably $a_i$ is a pass-through column. | Mark $a_i$ as a mandatory column |
| References missing to any column | If the static analysis of the SQL query syntax yields no specific columns (or only the partitioning columns), then with a high probability all columns are mandatory (or at least, there are no parameters that specify which columns are mandatory). | Mark all columns as mandatory |

According to Table 5, the analytical function properties learning engine 108 can either mark an attribute as mandatory, based on a respective heuristic given how an attribute is used or invoked in a database query, or can set a value of the adjustment delta, which can have a range of values (discrete values or continuous values). In some examples, the adjustment delta can be a negative value to indicate that the corresponding attribute is unlikely to be a mandatory column, or a positive value to indicate that the corresponding attribute is likely to be a mandatory column. Also, if the magnitude of a negative adjustment delta is larger, then that can be an indication that the corresponding attribute is less unlikely to be a mandatory column. Correspondingly, if the magnitude of a positive adjustment delta is larger, then that can be an indication that the corresponding attribute is more unlikely to be a mandatory column.

Based on an analysis of the k queries in G according to the example heuristics of Table 5, the analytical function properties learning engine 108 outputs a collection of candidate instruction sets that are applicable to all of the k queries in G.

Table 6 below shows an example of candidate instruction sets that can be output by the analytical function properties learning engine 108.

TABLE 6

For each query $Q_i$ $\forall$ i $\in$ [1, k]
    Generate one or more candidate column sets $C_{Qi} = \{C_{Qi\text{-}1}, C_{Qi\text{-}2}, ..., C_{Qi\text{-}v}\}$, where
    each candidate column set $C_{Qi\text{-}j} = \{a_1, a_2, ..., a_m\}$ is a subset of the columns in $R_{primary}$.
    //Each $C_{Qi\text{-}j}$ is a potential set of the minimal columns needed by analytical function F( )
    for query $Q_i$, and where $C_{Qi\text{-}m}$ differs from $C_{Qi\text{-}n}$ if m ≠ n (i.e., the subset of columns in
    $C_{Qi\text{-}m}$ is different from the subset of columns in $C_{Qi\text{-}n}$).
    Generate the candidate instruction sets $I_{Qi}$ corresponding to column selections,
    where $I_{Qi} = \{I_{Qi\text{-}1}, I_{Qi\text{-}2}, ..., I_{Qi\text{-}v}\}$, and where each $I_{Qi\text{-}j}$ is a set of instructions (e.g.,
    JavaScript Object Notation (JSON) instructions) that results in extracting candidate
    columns of the candidate column set $C_{Qi\text{-}j}$ from query $Q_i$.    // $I_{Qi\text{-}j}$ are similar
    instructions to those in a function descriptor
Let $Ig = \{I_{All\text{-}1}, I_{All\text{-}2}, ..., I_{All\text{-}w}\}$ be the sets of instructions applicable to all queries in G. That is:
    $I_{All\text{-}j} \in I_{Qi}$ $\forall$ j $\in$ [1, w] and $\forall$ i $\in$ [1,k]    // Ig includes the candidate instruction sets that
Task 2 predicts to hold or all queries in the training set for the given invocation signature.

All queries $Q_i$ $\forall$i $\in$ [1, k] in Table 6 are for a single invocation signature of the analytical function F( ).

1.1.3 Task 3 (Offline Learning through Mocked Execution)

Task 3 involves learning of the projection-push properties using offline mocked executions of the database queries in G over their sample datasets. The goal is to test the candidate instruction sets Ig generated from Task 2, and identify one or more instruction sets that each: (1) involves the minimal possible columns (no one is superset of another set), and (2) results in correct execution of all of the queries in G as if the queries have executed on the entire schema of $R_{primary}$. The procedure for generating these instruction sets is outlined below in Table 7.

TABLE 7

Output $O_{final} = \{\ \}$
For each query $Q_i$ $\forall$ i $\in$ [1, k]    //All these queries are for a single invocation
signature of function F( )
    Output $O_i = \{\ \}$
    $Result_{GT}$ = Execute $Q_i$ using the entire schema of its $R_{primary}$  //$Result_{GT}$ is
    the ground truth results for $Q_i$. Recall that the training repository contains all
    needed data for the execution including copies of the dimension tables as well
    as a small sample of $R_{primary}$.
    For each instruction set $I_j \in Ig$ $\forall$ j $\in$ [1, w]
        Apply $I_j$ over $Q_i$ to project out some columns from the schema of
        $R_{primary}$
        $Result_{Qi\text{-}Ij}$ = Execute $Q_i$ using the manipulated schema of $R_{primary}$
        IF (execution succeeds & $Result_{Qi\text{-}Ij}$ is identical to $Result_{GT}$)
            $O_i = O_i \cup I_j$        //Add Ij to the output set.
$O_{final} = \cap$ Oi $\forall$ i $\in$ [1, k]    //The final candidate instruction sets are those that
succeeded in all queries, and are included in the final set $O_{final}$ 1.1.4 Task 4 (Consolidation and Recommendations to Domain Experts)

After learning the projection-push properties for a given invocation signature of the analytical function F( ), task 4 involves sending the final set $O_{final}$ to one or more domain experts for validation and approval (such as by sending to one or more remote devices 126 associated with the one or more domain experts 128 in FIG. 1).

Task 4 also involves consolidating the recommendations across multiple invocation signatures if possible. That is, if the analytical function properties learning engine 108 learns the properties over multiple invocation signatures, the analytical function properties learning engine 108 produces a respective final set $O_{final}$ for each invocation signature. The system can consolidate these multiple final sets $O_{final}$, e.g., possibly by intersecting them or applying some other manipulation operations with the goal of generating instruction sets that are stable and applicable across multiple invocation signatures.

Given the recommendations in $O_{final}$ for a given analytical function, the one or more domain experts can provide feedback in any of various different forms, for example:

Approving the recommendations only for the given invocation signatures analyzed by the analytical function properties learning engine 108;

Approving the recommendations and expanding their applicability to other (and possibly all) invocation signatures;

Denying the recommendations and asking the system to expand the training set by another batch of queries;

Denying the recommendations and disabling the autonomous learning for the given analytical function.

1.1.5 Task 5 (Exploitation in Query Optimizations)

The approved recommendation(s), which form(s) the projection-push properties, from Task 4 along with their associated invocation signatures can be stored in the DBMS 102. The stored projection-push properties can be exploited by the collaborative optimizer 122 for optimizing subsequently received database queries.

In the cases where the approved projection-push properties is applicable to all invocation signatures, a function descriptor can be automatically generated, such as in the same structure and format as would manually be created by domain experts. As a result, the collaborative optimizer 122 can consume the function descriptor seamlessly.

1.2 Case 2: Analytical Functions with Multiple Primary Tables

For analytical function invocations having multiple primary tables, say $R_{primary}^1, R_{primary}^2, ..., R_{primary}^w$, the same approaches presented above can be applied but with some additional considerations. For example, a sample of each primary table is stored in the training repository 132 to ensure that the training repository 132 has a manageable size. If the schema of the primary tables is identical, which probably means the primary tables will be augmented (union) together, then each primary table can be sampled independently. However, if there is primaryKey-foriegnKey relationship between the primary tables, which probably means the primary tables will be joined, then the sampling of the primary tables should ensure that the join result based on the samples still produces meaningful records for the mocked execution.

For projection list correlation, additional heuristics and learning can be applied to judge how the schemas of the primary tables are correlated with each other and which relationships to honor. For example, primaryKey-foriegnKey relationships are preserved and these columns are kept in the projection list. In addition, if the schema of all primary tables is identical (or near identical), then most probably the schema after the projection should remain identical.

2. Autonomous Learning of Predicate-Push Properties

Table 8 below provides an example SQL query Q involving an invocation to an analytical function F( ) along with a post-function predicate p on the analytical function's output.

TABLE 8

```
SELECT ...
FROM ... , F(
           ON R_primary [PARTITION BY ...] [ORDER BY ...]
                                  //Primary input table R_primary(a_1, a_2, ..., a_n)
           [ON R_1 DIMENSION]     //Optional Dimension table
           ...
           [ON R_k DIMENSION]     //Optional Dimension table
       USING                      //Set of function's parameters
                Parameter P_1(...)
                Parameter P_2(...)
                ...
                Parameter P_m(...) ) AS F_Output
WHERE <predicate p on F_Output>
...
```

An objective is to learn the predicate-push properties of F( ) to decide whether or not predicate p can be pushed to the analytical function's primary input $R_{primary}$. The predicate-push properties can include two properties, e.g., rowIndependence and partitionIndependence (each of these two properties can be a Boolean property settable to one of two values). It is worth noting that unlike the projection-push properties that are in the form of instructions, the predicate-push properties are simpler as they can include Boolean flags.

The property rowIndependence if true indicates that the analytic function can operate on each row of a table independently of other rows of the table.

The property partitionIndependence if true indicates that the analytic function can operate on each partition of data (as defined by partitioning columns in a PARTITION BY clause) independently of other partitions of data.

The meaning of the rowIndependence and partitionIndependence properties is further explained in Table 9.

TABLE 9

| | | Yes | No |
|---|---|---|---|
| rowIndependence | | This property is "Yes" if the analytical function satisfies the following three conditions: | If any of the three conditions specified under "Yes" is not met. |
| | 1. | The analytical function invocation does not involve a PARTITION BY clause on the input primary table; | If the property is "No", then a post-function predicate cannot be pushed to the analytical function's input |
| | 2. | The analytical function operates on each row independent of the other rows; | |
| | 3. | For a single input row, the analytical function may produce: zero output rows, or one or more rows all as the input row values (or subset of its fields) plus possibly additional columns. In other words, the names of the input columns are preserved if passed through the function. | |

TABLE 9-continued

| | Yes | No |
|---|---|---|
| | If the property is "Yes", then a post-function predicate on any of the input columns, that pass through to the output, can be pushed as a pre-function predicate and gets evaluated on the analytical function's input | |
| partitionIndependence | This property is "Yes" if the analytical function satisfies the following three conditions:<br>1. The analytical function invocation involves a PARTITION BY clause on the primary input table;<br>2. The analytical function operates on each partition independent of the others;<br>3. For a single input partition, the analytical function may produce: zero output rows, or one or more rows all having the same values in the partitioning columns as those of the input partition (or subset of its fields) plus possibly additional columns<br>If this property is "Yes", then a post-function predicate on any of the PARTITION BY columns, that pass through to the output, can be pushed as a pre-function predicate and gets evaluated on the analytical function's input. | If any of the three conditions specified under "Yes" is not met. If the property is "No", then a post-function predicate cannot be pushed to the analytical function's input |

2.1 Task 1 (Incrementally Building the Training Repository at Query Time):

Task 1 for building the training repository 132 for learning predicate-push predicates is the same as task 1 for building the training repository 132 for learning projection-push properties discussed above in Section 1.1.1.

2.2 Task 2 (Offline Learning through Heuristics)

Task 2 is triggered when k queries are collected, $G=\{Q_1, Q_2, \ldots, Q_k\}$. The k queries share the same invocation signature of a given function $F(\ )$. In task 2 for learning predicate-push predicates, the analytical function properties learning engine 108 applies a set of static heuristics on the syntax of the k queries. Examples of these heuristics are included in Table 10 below.

TABLE 10

| Heuristic | Description | Action |
|---|---|---|
| Column name matching | Predicate p has to include a column name matching one of the inputs to the analytical function. Furthermore, if F( ) includes the optional PARTITION BY clause, the predicate p has to include a column name from the partitioning columns in the PARTITION BY clause | If no column name matching is present, then the predicate p cannot be pushed. |
| Data Type Matching | Another sanity check is that after the column name matching is successful, the data types of the matching columns have to also match. | If there is no data type matching, then the predicate p cannot be pushed. |

2.3 Task 3 (Offline Learning through Mocked Execution)

2.3.1 Learning Row-Independence Property (No Partitioning)

Row independence between rows exists if the analytical function invocation does not involve partitioning, i.e., there is no PARTITION BY clause on $R_{primary}$. The goal is thus to learn whether or not the analytical function processes each row independently of the other rows. The procedure below selects a subset of the input data records (referred to as coreSet). These data records are placed among different sets of other data records, and the analytical function is executed on each set. If all executions produce the same output for coreSet, then it is probable that the analytical function operates on each data record independently of the other data records, i.e., rowIndependence=Yes. Otherwise, there can be a possibility of dependency between rows, i.e., rowIndependence=No.

Table 11 below is an example of determining row independence between rows.

TABLE 11

For each query $Q_i$ ∀ i ∈ [1, k]  //All these queries are for a single invocation signature of function
                                                      F( )
    $Q_i$.coreSet = Randomly selected set of rows from the $R_{primary}$ sample in the training repository
    Put $Q_i$.coreSet within other non-overlapping (possibly empty) samples of $R_{primary}$ sample in the training repository.
        Referred to as {$S_1$, $S_2$, ..., $S_v$}, i.e.,$Q_i$.coreSet ⊆ $S_i$ ∀ i ∈ [1, v]
  For i = 1 to v  //For each of the samples
        Replace $R_{primary}$ by $S_i$ and execute function F( )  //We can only execute F( ) not the entire $Q_i$
        Keep track of the output data records corresponding to input data records of
        $Q_i$.coreSet (e.g., though unique identifiers of the data records)
  IF (all output data records of $Q_i$.coreSet are identical across the v samples)
        Mark $Q_i$.F( ) with rowIndependence = Yes
                                      //F( ) exhibits row independence within $Q_i$
  Else
        Mark $Q_i$.F( ) with rowIndependence = No
IF (all $Q_i$.F( ) are marked with rowIndependence = Yes)
                                      //F( ) exhibits row independence across all $Q_i$
  Mark F( ) with rowIndependence = Yes
Else
  Mark F( ) with rowIndependence = No

2.3.2 Learning Partition-Independence Property

For functions that involve partitioning, i.e., there is a PARTITION BY clause on $R_{primary}$, the goal is to learn whether or not the function processes each partition independently of the other partitions.

Functions that can be called with or without PARTITION BY clause are considered to have distinct invocation signatures, and each invocation signature is learned separately by its own training set of queries.

The procedure here is similar to the one proposed for learning the row-independence property, except that the sampling of the input data records in coreSet is at the partition level. Partition independence exists if the following conditions are satisfied:

Partition Level: $Q_i$.coreSet is a subset of partitions from the $R_{primary}$ sample in the training repository.

Partition Completeness: Selected partitions in $Q_i$.coreSet have to be complete, i.e., if partition x is represented in $Q_i$.coreSet, then all of partition x's data records from $R_{primary}$ sample has to be included in $Q_i$.coreSet.

These conditions ensure that $Q_i$.coreSet is intact when put within other samples, and hence if the analytical function exhibits a partition independence model, the results from the partitions in $Q_i$.coreSet will remain the same across all executions.

2.4 Tasks 4 & 5 (Recommendations to Domain Experts & Exploitation in Query Optimizations Tasks 4 and 5 for predicate-push properties are similar to tasks 4 and 5 for projection-push properties discussed sections 1.1.4 and 1.1.5.

Basically, the learned values for the flags rowIndependence and partitionIndependence can be recommended to one or more domain experts for approval, and can be used by the collaborative optimizer 122 in determining whether predicate push is possible for an analytical function.

Figure 2:
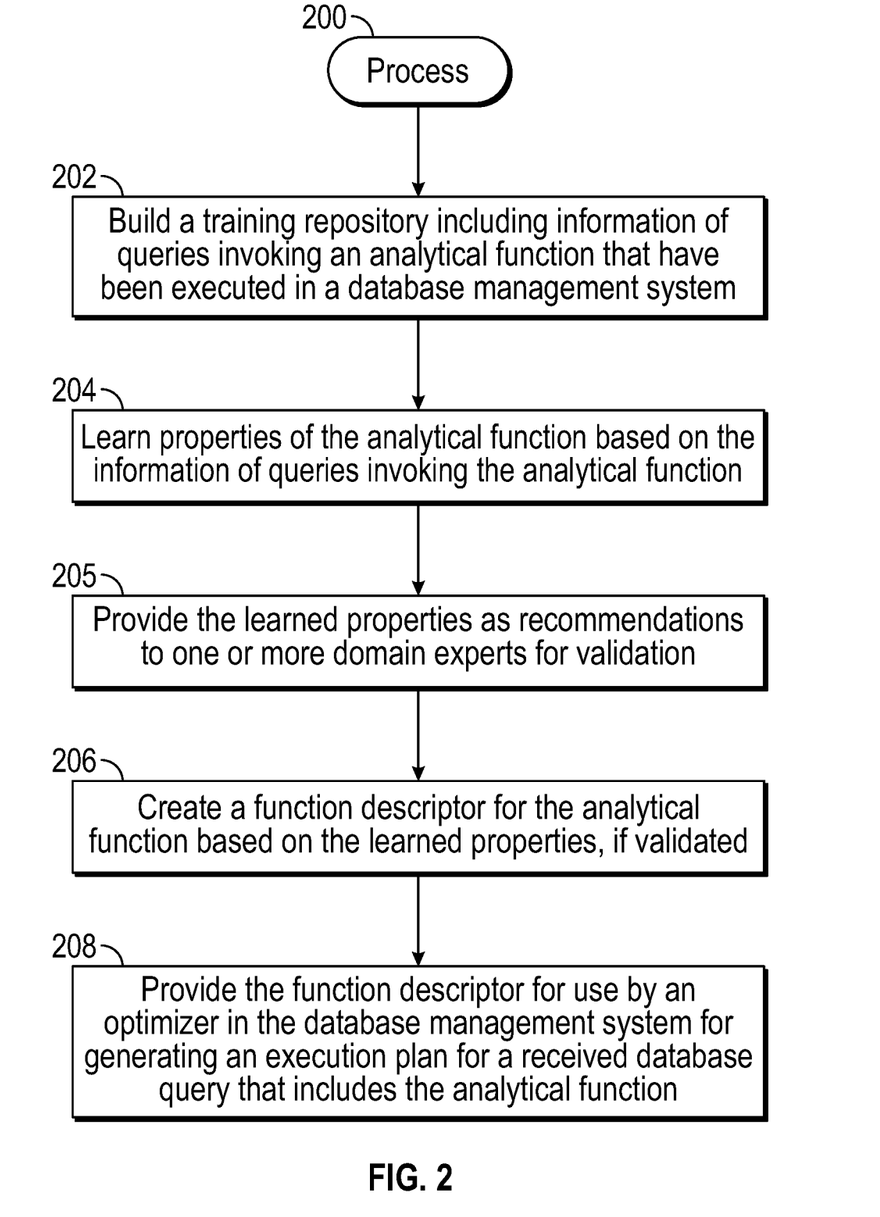
FIG. 2 is a flow diagram of an example process according to some implementations of the present disclosure.

FIG. 2 is a flow diagram of an example process 200 of the autonomous learning system 104, in accordance with some implementations of the present disclosure.

The process 200 includes building (at 202) a training repository (e.g., 132 in FIG. 1) including information of queries invoking an analytical function that have been executed in a database management system.

The process 200 includes learning (at 204) properties (e.g., projection-push properties and/or predicate-push properties) of the analytical function based on the information of queries invoking the analytical function.

The process further includes providing (at 205) the learned properties as recommendations to one or more domain experts for validation.

The process 200 creates (at 206) a function descriptor for the analytical function based on the learned properties, if validated by the one or more domain experts.

The process 200 provides (at 208) the function descriptor for use by an optimizer in the database management system for generating an execution plan for a received database query that includes the analytical function.

Figure 3:
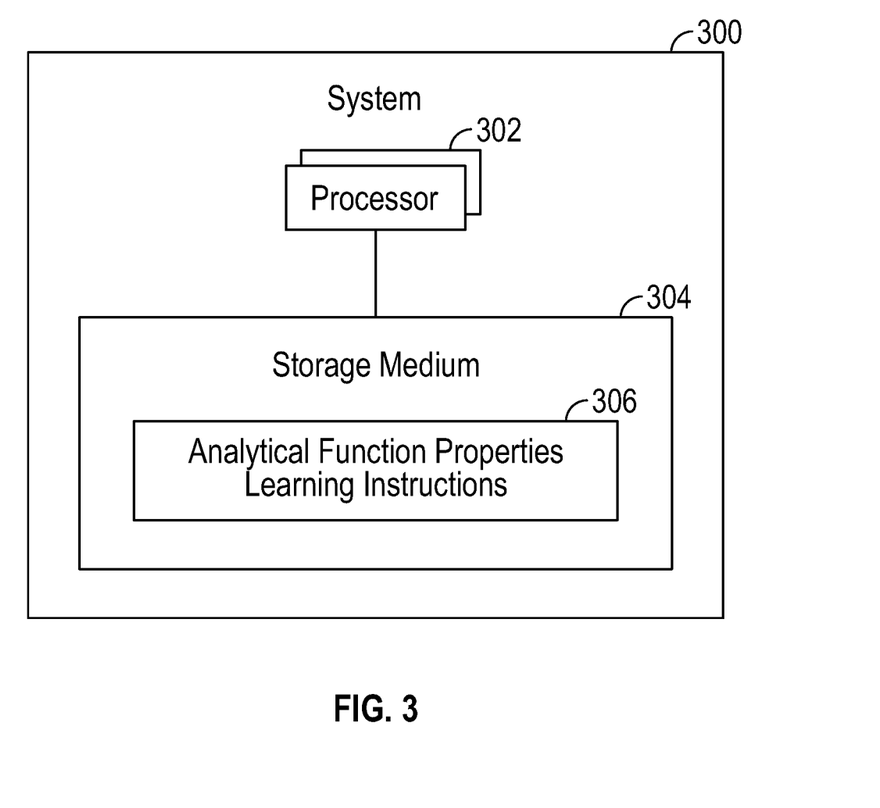
FIG. 3 is a block diagram of an example system according to some implementations of the present disclosure.

FIG. 3 is a block diagram of a system 300, such as the autonomous learning system 104 of FIG. 1.

The system 300 includes one or more hardware processors 302. A hardware processor can include a microprocessor, a core of a multi-core microprocessor, a microcontroller, a programmable integrated circuit, a programmable gate array, a digital signal processor, or another hardware processing circuit.

The system 300 further includes a non-transitory machine-readable or computer-readable storage medium 304 storing machine-readable instructions that are executable on the one or more hardware processors 302 to perform various tasks. The machine-readable instructions can include analytical function properties learning instructions 306 that can perform tasks similar to those of the analytical function properties learning engine 108 of FIG. 1.

The storage medium 304 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   build a training repository by adding information of queries invoking an analytical function that have been previously executed to the training repository;
   learn properties of the analytical function based on the information of the queries in the training repository;
   create a function descriptor for the analytical function based on the learning; and
   provide the function descriptor for use by an optimizer in generating an execution plan for a received database query that includes the analytical function.

2. The non-transitory machine-readable storage medium of claim 1, wherein the building of the training repository comprises incrementally building the training repository as queries are received by the system.

3. The non-transitory machine-readable storage medium of claim 1, wherein the adding of the information of the queries to the training repository comprises:
   adding a syntax of the queries to the training repository; and
   adding sample data sets of input tables for the queries in the training repository.

4. The non-transitory machine-readable storage medium of claim 1, wherein the learned properties include a projection-push property relating to mandatory attributes of the analytical function.

5. The non-transitory machine-readable storage medium of claim 4, wherein the projection-push property relates to a minimal set of attributes for correct execution of the analytical function.

6. The non-transitory machine-readable storage medium of claim 4, wherein the learning of the projection-push property comprises indicating if an attribute in a database query is a mandatory attribute based on one or more heuristics.

7. The non-transitory machine-readable storage medium of claim 6, wherein the one or more heuristics comprise one or more selected from among an explicit reference to the attribute in a PARTITION BY clause or an ORDER by clause, an explicit reference to the attribute in a parameter of the analytical function, an implicit reference to the attribute in a database query, a reference to the attribute in an outer query outside of an invocation of the analytical function, or references missing to any attribute.

8. The non-transitory machine-readable storage medium of claim 6, wherein the learning of the projection-push property produces a candidate instruction set corresponding to selection of one or more mandatory attributes.

9. The non-transitory machine-readable storage medium of claim 8, wherein the instructions upon execution cause the system to:
   send the candidate instruction set to a domain expert,
   wherein the function descriptor is based on feedback from the domain expert, the feedback approving or modifying the candidate instruction set.

10. The non-transitory machine-readable storage medium of claim 1, wherein the learned properties include a predicate-push property relating to whether a predicate to be applied on an output of the analytical function as specified by a database query can be moved to apply to an input of the analytical function.

11. The non-transitory machine-readable storage medium of claim 10, wherein the learning of the predicate-push property comprises indicating whether the predicate can be moved based on one or more heuristics.

12. The non-transitory machine-readable storage medium of claim 11, wherein the one or more heuristics comprise one or more of an attribute in the predicate matching an attribute in an input to the analytical function, or a data type of the attribute in the predicate matching a data type of the attribute in the input to the analytical function.

13. The non-transitory machine-readable storage medium of claim 11, wherein the learning of the predicate-push property produces a candidate value of a property, and wherein the instructions upon execution cause the system to:
   send the candidate value of the property to a domain expert,
   wherein the function descriptor is based on feedback from the domain expert, the feedback approving or modifying a candidate instruction set.

14. The non-transitory machine-readable storage medium of claim 10, wherein the predicate-push property comprises a row-independence property indicating whether the analytical function can be applied on a row independently of other rows.

15. The non-transitory machine-readable storage medium of claim 14, wherein the row-independence property being false indicates that the predicate cannot be moved to apply to the input of the analytical function.

16. The non-transitory machine-readable storage medium of claim 10, wherein the predicate-push property comprises a partition-independence property indicating whether the analytical function can be applied on a partition independently of other partitions.

17. The non-transitory machine-readable storage medium of claim 16, wherein the partition-independence property being false indicates that the predicate cannot be moved to apply to the input of the analytical function.

18. A method performed by a system comprising a hardware processor, comprising:
- building a training repository comprising information of queries invoking an analytical function that have been executed in a database management system;
- autonomously learning properties of the analytical function based on the information of the queries invoking the analytical function;
- creating a function descriptor for the analytical function based on the learning; and
- providing the function descriptor for use by an optimizer in the database management system for generating an execution plan for a received database query that includes the analytical function.

19. The method of claim 18, wherein the learning of the properties of the analytical function uses one or more heuristics, and is further based on mocked execution using a sample of a primary table.

20. A system comprising:
- a processor; and
- a non-transitory storage medium storing instructions executable on the processor to:
  - build a training repository by adding information of queries invoking an analytical function that have been previously executed to the training repository;
  - learn properties of the analytical function based on the information of the queries in the training repository;
  - create a function descriptor for the analytical function based on the learning; and
  - provide the function descriptor for use by an optimizer in generating an execution plan for a received database query that includes the analytical function.

* * * * *